United States Patent [19]

Söderqvist et al.

[11] 4,234,329
[45] Nov. 18, 1980

[54] METHOD FOR THE PRODUCTION OF MINERAL FIBERS WITH UNITARY FIBER LENGTH CHARACTERISTICS

[75] Inventors: Gunnar M. T. Söderqvist; Ulf L. Åberg, both of Sköde, Sweden

[73] Assignee: Rockwool Aktiebolaget, Skövde, Sweden

[21] Appl. No.: 16,382

[22] Filed: Mar. 1, 1979

[30] Foreign Application Priority Data

Mar. 2, 1978 [SE] Sweden .............................. 02388/78

[51] Int. Cl.³ ....................... C03B 37/04; C03B 37/02
[52] U.S. Cl. .............................................. 65/2; 65/5; 65/29; 162/49; 162/198; 75/54; 73/432 PS
[58] Field of Search ...................... 65/2, 5, 29; 162/49, = 162/198; 73/54, 432 PS

[56] References Cited

U.S. PATENT DOCUMENTS

| | | | |
|---|---|---|---|
| 3,163,172 | 12/1964 | Buzzard | 73/54 X |
| 3,416,376 | 12/1968 | Johnson et al. | 73/432 PS |
| 3,539,316 | 11/1970 | Trethewey | 65/2 |

Primary Examiner—Robert L. Lindsay, Jr.
Attorney, Agent, or Firm—Larson, Taylor and Hinds

[57] ABSTRACT

A sample of mineral fibers is dispersed in a liquid and viscosity of the dispersion is measured. The viscosity value provides a rapid measure of the length of the fibers. The measurement is sufficiently rapid that adjustments can be made to operating conditions during a production run to ensure the production of fibers of uniform length characteristics.

31 Claims, 3 Drawing Figures

METHOD FOR THE PRODUCTION OF MINERAL FIBERS WITH UNITARY FIBER LENGTH CHARACTERISTICS

BACKGROUND OF THE INVENTION

The present invention relates to a method for the production of mineral fibers with uniform fiber length characteristics.

It is well known that the mineral fibers such as mineral wool, are produced, as a rule, by melting in a melting oven, preferably a cupola oven. The mineral forming the mineral fibers, e.g. a mixture of suitable stone species, kinds of glass or types of slag, is melted by means of heat obtained by combustion of some suitable material, usually coke. Thereafter, the melt is tapped off at the bottom part of the oven and is brought to flow down onto a fiber-forming aggregate. The fiber-forming aggregate includes, in the best systems for production of mineral fibers and mineral wool, a spinner wheel or a cascade of a plurality of spinner wheels. The melt is thrown out by the centrifugal force of the wheel, and is caught by a stream of air, which transfers the melt to a perforated collection band on which the fibers formed from the melt are deposited simultaneously as the motive air leaves through the perforations of the band.

In such a method, one will not get fibers of interminable length: the fibers are of limited length, which is, however, subject to great mutual variations. The fibers are not positioned in a straight line, because the conveyor band is moving at a much lower speed than the speed at which the fibers are thrown out. Consequently, the fibers are laid down in the form of loops or bends, and, in addition, a plurality of different fibers will become interwoven into each other.

Now, it has proved that one may advantageously use the mineral fibers as a re-inforcement means in different case materials, especially plastics, and that the re-inforcement power is, to a very high extent, dependent upon the fiber length.

It will be evident from the above, that it is important, firstly that one can measure the fiber length, and secondly that one can influence the production means in such a way that the desired fiber length will be obtained. It is not possible, in practice, to produce mineral fibers by economically defendable means, which possess a constant fiber length. Therefore, one has had to be satisfied with a given mean fiber length. However, even then, certain difficulties remain. It is obvious that with a given mean value of the fiber length, the mineral fibers may have very different properties dependent upon if there is a great difference between the shortest and the longest fiber length, or if this difference is only rather small. Thus, there are two different and important magnitudes for the fiber length: on the one hand, the mean fiber length; and on the other hand, the extent of the deviation from the mean fiber length. The greater the spreading of fiber length is at a given mean value, the more "long fibrous" will the mineral fiber appear, and this property of being long fibrous is an essential parameter in what has been called "the fiber length characteristic" of the mineral fiber. This characteristic, therefore could be expressed in the form of an expression having two variables, viz. $L \pm f(1)$. L indicates in this formula the mean fiber length and $f(1)$ is a function indicating partly the number of fibers deviating from the mean fiber length and partly the amount of such deviation. The functional connection, thus, will be a little complicated.

It was previously known that measurement of the fiber length may under given circumstances be desirable. However, there has been no reliable and suitable method available for the execution of the measurement. As a matter of fact, the known measurement took place as follows: (1) a small quantity of mineral fibers is spread out into a very thin layer and optically reproduced on a screen, so that one could follow each separate fiber in its run; and, (2) with a so called map meter (an instrument comprising a small rifled pulley in connection with a measurement or counting device), the fiber length on the screen or table, on which the reproduction takes place, is measured. The measurement of a single fiber, in the said method, takes an unreasonably long time, and if it is desired to state the properties of a mineral wool comprising a great number of fibers by their fiber length characteristic, this method consumes such a long time, that the method is uneconomical. Moreover, and this is perhaps the more important thing, it is so tedious, that it cannot be used during a production run. On the other hand, it is obvious that if it is desired to produce mineral fiber material having a given fiber length characteristic, it must be possible quickly to correct the errors created due to the unavoidable variations in the behavior of the system. These variations depend upon certain relations known per se, but some may be used for controlling the behavior of the system, in order to get at least approximately the desired fiber length characteristic. If this is done, however, it becomes necessary to find a way sufficiently quickly to measure the variables contained in the fiber length characteristic and to cause them to influence the production system in order to improve the fiber length characteristic.

The relations in the production system, which influence the fiber length characteristic, firstly so that fiber length will be changed upon involuntary changes of the said relations, and secondly so that one may, by influencing said relations, correct existing deviations, include the following:

A first matter acting upon these relations is the choice of the raw material. The raw material is charged into the melting oven at its upper end. Before an amount of melt, determined by the choice of the raw material, has reached the bottom of the melting oven in order to be tapped off to a fiber-forming aggregate, usually rather a long time will lapse. Influencing the properties by choice of the raw material, of course, may be used in the sense that one may by long-time tests state that a given raw material will, as a rule, give a more favourable fiber length characteristic. But a quick control of deviations in the fiber length characteristic can scarcely be possible in practice in this way.

Similar conditions apply for the amount of fuel fed. The variations existing in the fiber length characteristic as a result of variation of the quantity of fuel fed also act rather long periodically, and therefore they cannot be used for quick control of the fiber length characteristics of the mineral fibers.

Amongst the quick acting means may be mentioned the type of blast air conpulsorily fed to the oven, which may have different temperature, different pressure, or different amount of oxygen. (The last mentioned provided that oxygen is added to the blast air in controlled amount.) Secondly the speed of the rotating spinner wheels may be mentioned. Both of these conditions may be controlled rather quickly, and especially the speed of the spinner wheels may be controlled at the highest possible speed, so that this type of control may be said to be practically instantaneous.

Of the two last mentioned control means, the type of the blast air has proved to be the one most easily available.

It will be obvious that the method according to the invention must comprise both the step of measuring the fiber length characteristic of the mineral fiber product by means of a quick acting measurement method, and also the step, by means of the result of the measurement, to correct deviations which may perhaps exist regarding the fiber length characteristics in relation to a predetermined desired value. The greatest difficulty in solving this problem has been to find a measurement method for the fiber length characteristic, which is sufficiently quick to be used during a production run, and which is also sufficiently accurate.

BRIEF SUMMARY OF THE INVENTION

The present invention is based upon the concept that a dispersion of fibrous material in a suitable liquid has a viscosity which is distinctly dependent upon the fiber length characteristic of the mineral fibers dispersed into the liquid. This concept is believed to be new per se.

The viscosity may be measured by rather quick acting means, and the result of the measurement may be expressed in the form of some electric magnitude such as voltage, frequency or the like, which may be used for control of the fiber-forming process. It will be especially advantageous to indicate the result of the measurement in the form of a pulse train of variable pulse frequency dependent upon the fiber length characteristic.

The invention, thus, relates to a method for the production of mineral fibers of uniform fiber length characteristics, whereby a melt is produced from the material or the mixture of materials forming the mineral fibers under combustion of a fuel, e.g. coke, in a melting oven, which is charged with the mineral or the mixture of minerals, resp. which shall form the melt. This melt is poured onto a fiber-forming aggregate, and the fibers given off from said fiber-forming aggregate are collected on a collection device, e.g. a continously running endless band.

According to the invention, samples are collected during the production of the mineral fibers, preferably during their way from the collection device to some other device for their continuous treatment. The sample fibers are dispersed in a liquid in a given weight ratio. The viscosity of the dispersion is thereafter determined in a viscosimeter, and the result obtained for the viscosity is compared in a comparator with a desired value. Any difference which amy exist between the two values may be stated in the form a signal magnitude, which is brought to influence the working conditions of the fiber-forming process.

DETAILED DESCRIPTION

The dispersion carrier liquid should be of such a type that it will wet the mineral fibers. Preferably, the liquid is either water containing a cationically acting wet agent, or some organic liquid.

The invention will be further described below in connection with an embodiment shown in the attached drawings, but it is understood, that the invention shall not be limited to this specific form of execution, but that all different kinds of modifications may occur within the scope of the invention.

Figure 1:
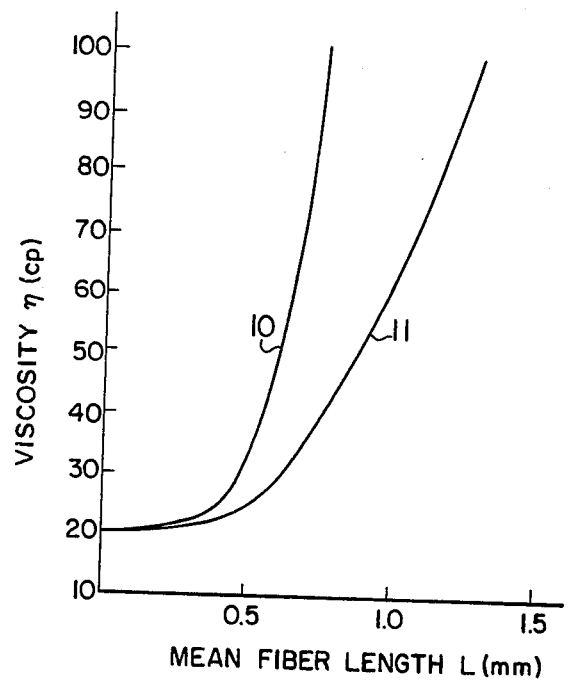
Figure 2:
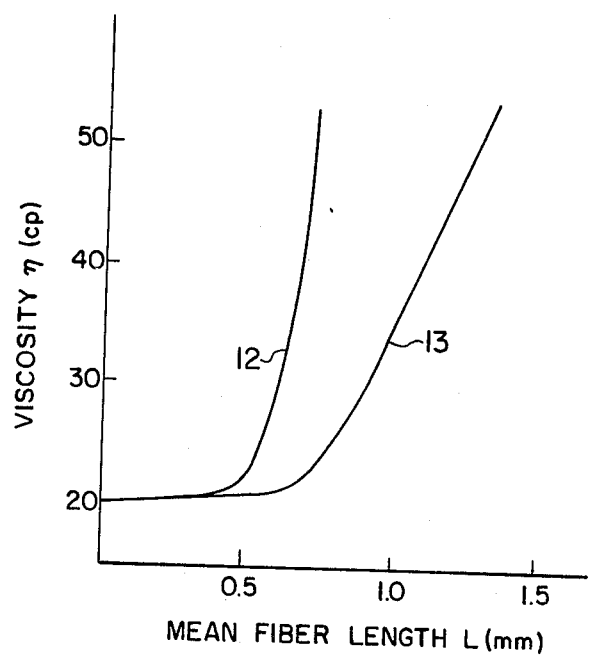
Figure 3:
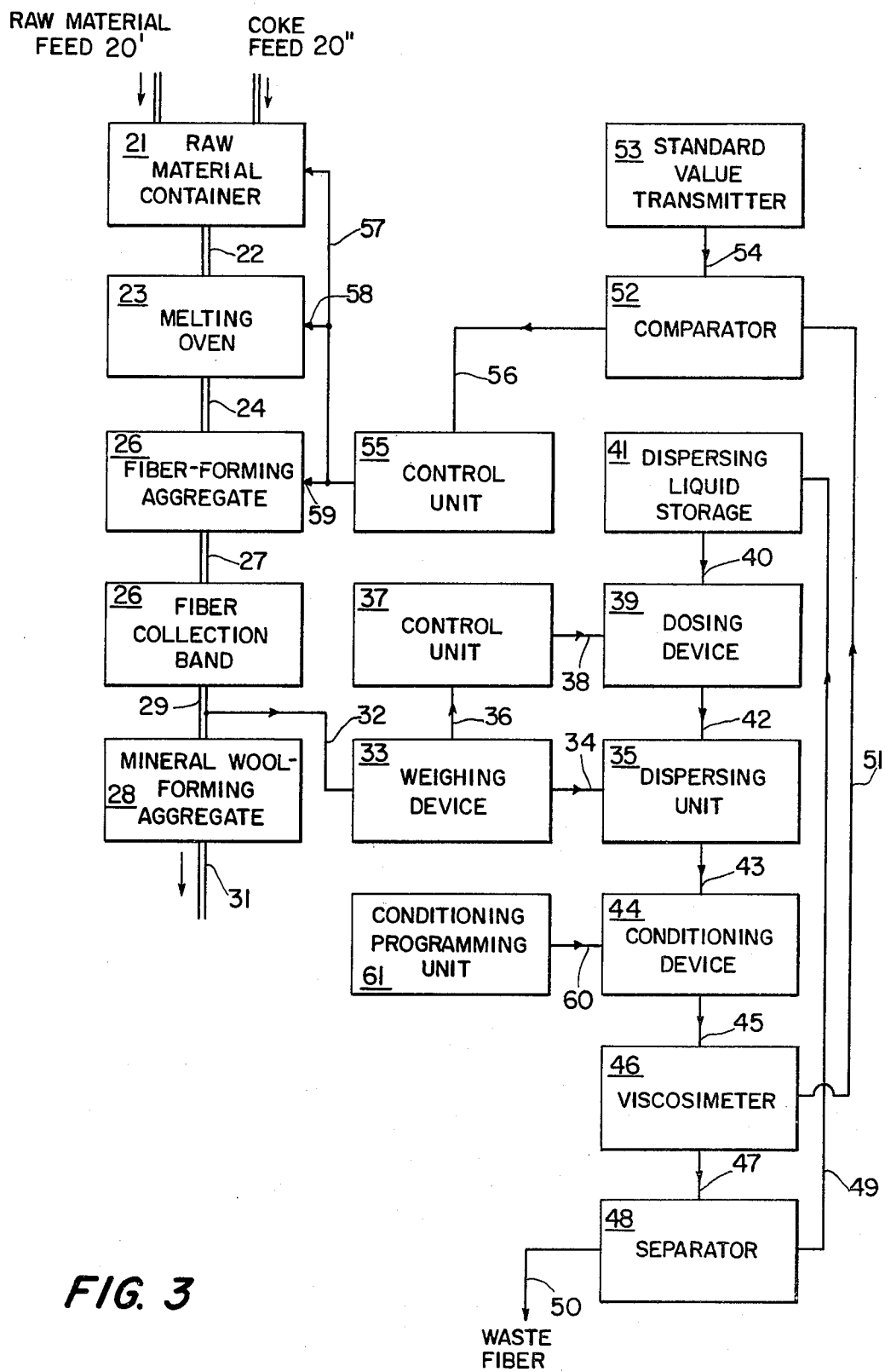

In the drawings, FIG. 1 and FIG. 2 show a pair of sets of curves, chosen as examples for indicating fiber length characteristics in the above mentioned way, whereas FIG. 3 shows a block diagram of a system in accordance with the invention. It should be observed, that the elements contained in the system according to FIG. 3 are throughout of such a type, that the technician skilled in the art will have no difficulty in providing such elements after he has once got full knowledge about the concepts forming the basis of the present invention.

In the tests for which account is given in FIG. 1, one had determined in the tedious and time consuming way described above, the mean value of the number of fibers in the dispersion, and the mean value of their lengths. The number of fibers measured with respect to their length and distribution as a rule was no less than 200 but in many cases up to approximately 400. Thereafter, a dispersion was produced from 0.5% mineral fiber material in a suitable liquid of the type indicated above, and for this purpose one used in the preparatory tests ethylene glycol ($CH_2OH-CH_2OH$), although for practical use glycerine ($C_3H_5(OH)_3$) would be more suitable. In FIG. 1 the viscosity ($\eta$) is plotted along the vertical axis in centipoises and the mean length of the fibers is plotted along the horizontal axis in millimeters. The curve 10 refers to the mean value of the fibers, which had a given desired fiber length within given ranges of tolerance, whereas the curve 11 indicates the mean length of all of the fibers in the dispersion. In FIG. 2, in a corresponding way, the same values are indicated by means of curve 12 corresponding to curve 10 and of curve 13, corresponding to curve 11. In FIG. 2, however, the dispersion contained only 0.25% mineral fibers in the same dispersing agent.

It is immediately seen from the two pairs of curves that unambiguous relations exist. To make sure that this is the case and to achieve an estimation of the reliability of the curves produced, a very great number of repeated tests were made with the same mineral fiber material and the same dispersion agent under fully identical conditions regarding pressure, temperature, conditioning time, and so on, and the spreading shown by the measured values was remarkably small, which appears to be a proof of the reliability of the method.

It is seen from the curves that within a characteristic part they approach a traditional third degree curve. It has been impossible to show any theoretical explanation of the curves acquiring this mathematical form. Nevertheless, the geometrical similarity with a third degree is striking. In other words, one could mathematically express the curve in the following way:

$$\eta = a + b \cdot L + c \cdot L^2 + d \cdot L^3,$$

$\eta$ indicating in this formula the measured viscosity value, L indicating the observed mean length value of the fibers, and a, b, c and d being arbitrary constants. Knowledge about the value of the constants for each separate mineral fiber material and under the conditions existing in each separate case is of importance for the execution of the invention, as will be explained below. The equation of the curve may advantageously be derived, for instance according to the method of the smallest square value and on basis of the observed, point formed distributed values of same.

The measurement proceeded in the following way:

For the production of the dispersion, a given rather small representative amount of mineral fibers in the dry state is weighed: for the test according to FIG. 1, 1.0 grams and for the test according to FIG. 2, 0.5 grams, in both cases with an accuracy of ±1 milligram. To this fiber material is added a quantity of the dispersion agent liquid of 200 milliliters of ethylene glycol, and the fiber material is dispersed by means of a magnetic stirrer, whereby a given decomposition of the fiber material in mechanical respect may take place. It proves, however, that in spite of this perhaps occuring decomposition, the result is indicative for what should have been obtained if no such decomposition had taken place. For stabilizing the dispersion, it is left quiescent for at least 30 minutes at a temperature of 20.0° C., said time being believed to be sufficient firstly for stabilization of the dispersion, and secondly for stabilization of its temperature. The last mentioned factor is important because the viscosity of most liquids, including ethylene glycol, is dependent upon temperature. The dispersion, thereafter, is subjected to lively stirring under controlled circumstances, so that the stirring effect would be the same from one test to the next one, and finally the viscosity is measured in a Brookfield rotational viscosimeter. The measurement value is read as quickly as possible after it had stabilized, because it can be observed that a given formation of flocks or pellets of mineral fiber material take place in time.

The values obtained for the viscosity are plotted along the vertical axis in FIG. 1 and FIG. 2, whereas the values for the mean length of the fiber, determined in advance by an optical mechanical measurement, are plotted along the horizontal axis. In the preceding optical mechanical measurement, one disperses 5 milligrams of the fiber material in 10 milliliters of a saturated solution of polystyrene in ethyl acetate, and the dispersion is precipitated in the form of drops on an objective glass in order to produce the optical reproduction in a largely amplified scale. After the ethyl acetate has evaporated, a thin polystyrene film is obtained with interposed fibers well visible. The lengths of which are determined without any difficulty but with essential loss of time. It was calculated that one had to measure in this way the length of approximately 200 to 400 separate fibers. Thereafter, a comprehensive calculation followed for determining the different mean values.

The foregoing work forms the basis for curves such as shown in FIGS. 1 and 2. These curves, thereafter, were considered as very reliable.

The automatic procedure according to the invention is shown in FIG. 3.

At 20' the material is fed, e.g. stone or a mixture of stones, which are to be melted, and at 20'' coke is fed, in both cases into a raw material container 21, in which they may perhaps be subjected to a desired mixing in order, thereafter, to be fed through a sluice 22 of some suitable type to the melting oven 23. During the combustion of the coke which melts the mineral raw material by means of its combustion heat, melt is collected in the bottom part of the melting oven 23 in a way known per se, in the form of a beam 24. This melt is tapped off downwardly onto a fiber-forming aggregate 26. From the fiber-forming aggregate 26 the melt is thrown out in the form of fine threads 27, which are transferred to a collection band 28, preferable a continuously running, endless, perforated band. The air used to blow the formed mineral fibers onto the band on the one hand cools the fibers and on the other hand is also removed through the perforation holes in the band, so that pure mineral wool will leave the band in the form of the stream 29 for further treatment in a mineral wool-forming aggregate 30, from which the ready made mineral wool product is removed in a course 31.

The system according to FIG. 3, in the parts hitherto described, is, of course, previously known.

From the mineral fibers in the course 29, however, a small part is taken off for control purposes, said part being introduced into a weighing device 33, in which an exactly determined quantity of the formed mineral fiber material, which is small as to its weight, is separated to be brought over channel 34 into a dispersing unit 35. Simultaneously with the weighing being fulfilled, and the weighed quantity of the mineral fiber material being conveyed to the dispersing unit 35 over the channel 34, a signal is given to a control unit 37 over the conduit 36, which is preferably an electric pulse conduit, and the control unit 37 in turn, over the conduit 38 influences a dosing device 39.

The dosing device 39 receives dispersing liquid over a conduit 40 from a store 41 for such dispersing liquid. Consequently a given quantity of dispersing liquid will be fed to the dispersing unit 35 over channel 42, simultaneously with the exactly weighed quantity of the mineral fiber material being fed to dispersing unit 35 over channel 34. In this way the produced dispersion is thereafter fed over channel 43 to a conditioning device 44. The conditioner may comprise a stirrer but in any case the conditioning device 44 should be of such a kind that each dose fed thereto is treated under exactly the same conditions and for exactly the same period of time. To ensure this, the conditioning device is connected over a conduit 60 to a programming unit 61, in which there is also contained a timer means. After conditioning is completed, the dispersion is brought over channel 45 to the viscosimeter 46.

After the viscosity measurement, the dispersion may be destroyed, but still more advantageously, it would be fed over conduit 47 to a separator 48, in which the liquid is separated from the solid mineral fibers. The liquid is recycled over the conduit 49 to the store 41 of liquid. The mainly valueless separated mineral fibers, now more or less dry, are removed over a waste material conduit 50.

In the viscosity meter device 46, however, a value has been obtained for the viscosity, and this is transferred over conduit 51 to a comparator 52, which is fed over conduit 54 with a standardized, pre-determined normal value from the standard value transmitter 53. In the comparator, therefore, a numerical value is created, indicated by means of a voltage, a frequency or the like, said value indicating the existing difference between the measured viscosity value and the desired viscosity value, obtained through conduits 51 and 54, resp. If this difference should be equal to zero or if it is sufficiently small, of course, no adjustment or the working conditions of the oven is needed, but if the difference should be more than a given value, such a re-adjustment of the working conditions has to take place in order to correct the properties of the mineral fiber material, so that this will acquire the desired fiber length characteristic value. The determination of what steps should be taken is made in the control unit 55, which is fed with the difference indicating value in the form of, for instance, a pulse train over the conduit 56.

The control unit 55 works like a data unit, in which a programming takes place regarding the control pulses to be fed to the production sequence for mineral fibers 20—31. This programming is what has to be taken into consideration in advance regarding measured influences from the fiber length characteristic on the different functions and vice versa, as explained above in connection with FIGS. 1 and 2.

It is without any decisive importance to the invention, what part of the initially described system 20—31 is influenced in order to restore the fiber length characteristic. For that reason, three different channels have been shown, one or two or all three of which may be effective for influencing the type of the raw material fed from the raw material store 31 to the melting oven 23 (conduit 57) and/or the type and the temperature of the combustion air fed to the melting oven (conduit 58) and/or the speed of the spinner wheels of the fiber-forming unit 26 (conduit 59).

Dependent upon the choice made between the three types of influences over one or some or all of the conduits 57, 58 and 59, of course also the programming unit 55 has to be pre-set in a suitable way.

The removal of samples over the conduit 32 should take place over rather short intervals of time so that due to the short duration of time between said intervals, supervision of the process may be regarded as an equivalent of continuous supervision. Of course, it cannot be avoided that a given viscosity determination will consume a given time during the continuous production run which is longer than the interval of time between the removal of the samples over the conduit 32. However this, as a matter of fact, will cause no damage as long as the difference in time is not too great and it may even be of use. One may assume that the specific circumstances causing the deviation of the fiber length characteristic has a rather long duration. By a test which shows the first time of such a deviation, one will therefore get a determination about a tendency to continued deviation, most probably at an increased extension, and this tendency of course should be removed as soon as possible and cause corrective steps to be taken over one or more or all of the channels 57, 58 and 59.

It will be obvious from the above, that the method according to the invention is not dependent upon the specific type of a melting over used, and is similarly not dependent upon the specific type of the fiber-forming system.

Practical tests have proved than one may, when using the described method, provide mineral fiber material, for instance mineral wool of any common type, such as stone wool, glass wool or slag wool, having the desired fiber length characteristic, and that one can maintain the fiber length characteristic extremely constant.

What is claimed is:

1. In a method of producing mineral fiber in which mineral fiber is produced from a melt under operating conditions which, if changed, cause a change in the length characteristics of fiber being produced, the improvement which comprises:
   obtaining a sample of the mineral fiber being produced;
   admixing the sample of mineral fiber and a dispersing liquid to form a dispersion of said fiber in the dispersing liquid; determining the viscosity of said dispersion;
   and adjusting at least one of said operating conditions in dependence upon the determined viscosity of said dispersion to cause a change in the length characteristics of the fibers being produced.

2. An improved method according to claim 1 including the further step of comparing the determined viscosity with previously determined viscosity data and wherein the adjustment of said operating conditions is carried out in dependence upon said comparison to produce mineral fiber having desired length characteristics.

3. An improved method according to claim 1 wherein said dispersing liquid comprises water containing a cationic wetting agent.

4. An improved method according to claim 1 wherein said dispersing liquid comprises an organic liquid.

5. An improved method according to claim 4 wherein said organic liquid is selected from the group consisting of ethylene glycol and glycerine.

6. An improved method according to claim 1 wherein, after the viscosity of said dispersion has been determined, the dispersed fiber and dispersing liquid are separated and the separated dispersing liquid is recycled for re-use.

7. An improved method according to claim 1 wherein the amount of sample fiber and dispersing liquid in said dispersion are in a pre-determined weight ratio.

8. An improved method according to claim 7 wherein a pre-determined weight of sample fiber is admixed with a pre-determined amount of said dispersing liquid to form said dispersion.

9. An improved method according to claim 1 including the further step of conditioning said dispersion prior to determining its viscosity.

10. An improved method according to claim 9 wherein said conditioning step comprises bringing the dispersion to a predetermined temperature.

11. An improved method according to claim 10 wherein said conditioning step comprises stirring said dispersion.

12. An improved method according to claim 1 wherein said mineral fibers are produced from a melt formed in a cupola oven and with blast air.

13. An improved method according to claim 12 wherein said blast air is pre-heated.

14. A method according to claim 12 wherein the operating condition that is adjusted is the amount of said blast air.

15. A method according to claim 14 wherein the operating condition that is adjusted is the temperature of said blast air.

16. A method according to claim 12 wherein said blast air comprises oxygen and wherein the operating condition that is adjusted is the proportion of oxygen in the blast air.

17. A method according to claim 1 wherein said fibers are produced on a fiber-forming aggregate comprising a spinning wheel and wherein the operating condition that is adjusted is the rotational speed of said spinning wheel.

18. A method according to claim 9 wherein said conditioning is carried out for a pre-determined length of time.

19. In apparatus for producing mineral fibers comprising means for melting raw mineral material and means for producing mineral fiber from the molten raw material, under operating conditions which, if changed, cause a change in the length characteristics of fiber being produced the improvement which comprises:

means for obtaining a sample of the fiber being produced;

means for adjusting at least one of said working conditions in dependence on the viscosity of a dispersion comprising said fiber sample and a dispersion liquid to cause a change in the length characteristics of the fiber being produced.

20. Apparatus according to claim 19 further comprising means for comparing the viscosity of said dispersion with previously determined viscosity data and means for generating an adjustment control signal in dependence upon viscosity data comparision, and wherein said adjustment means is responsive to said adjustment control signal.

21. Apparatus according to claim 19 further comprising means for admixing obtained sample fiber and a dispersion liquid to form a dispersion of sample fiber in dispersing liquid.

22. Apparatus according to claim 21 further comprising means for providing a pre-determined weight ratio of sample fiber and dispersing liquid for admixture.

23. Apparatus according to claim 21 further comprising means for conditioning said dispersion.

24. Apparatus according to claim 20 wherein said viscosity comparing means comprises means for generating said adjustment control signal in the event that the viscosity of said dispersion differs by a pre-determined amount from a previously determined value of viscosity.

25. Apparatus according to claim 19 wherein said fiber producing means comprises spinning wheel means and means for changing the speed of rotation thereof responsive to said adjustment control signal.

26. Apparatus according to claim 19 wherein said fiber producing means comprises blast air means and means for changing the amount and/or temperature thereof.

27. Apparatus according to claim 23 wherein said conditioning means comprises means for timing the conditioning of said dispersion.

28. Apparatus according to claim 19 further comprising means for admixing sample fiber and a dispersing liquid to form said dispersion.

29. Apparatus according to claim 28 further comprising means for providing pre-determined quantities of said fiber and liquid for admixing.

30. Apparatus according to claim 28 comprising means for determining the viscosity of said dispersion.

31. Apparatus according to claim 30 wherein said viscosity determining means comprises a rotational viscosimeter.

* * * * *